United States Patent
Thoms et al.

(10) Patent No.: US 7,159,613 B2
(45) Date of Patent: Jan. 9, 2007

(54) PRESSURE LIMITING VALVE IN A HYDRAULIC MACHINE HAVING A PRESSURE LIMITING VALVE

(75) Inventors: Reinhardt Thoms, Neumunster (DE); Bernd Hames, Henstedt-Ulsburg (DE); Markus Reimer, Klein Nordende (DE)

(73) Assignee: Sauer-Danfoss, Inc., Ames, IA (US)

( * ) Notice: Subject to any disclaimer, the term of this patent is extended or adjusted under 35 U.S.C. 154(b) by 66 days.

(21) Appl. No.: 11/061,006

(22) Filed: Feb. 18, 2005

(65) Prior Publication Data
US 2005/0211308 A1    Sep. 29, 2005

(30) Foreign Application Priority Data
Mar. 24, 2004 (DE) .................. 10 2004 014 485

(51) Int. Cl.
F16K 21/10 (2006.01)
F16K 17/04 (2006.01)

(52) U.S. Cl. .............. 137/514.5; 137/514; 137/529; 137/540; 251/337

(58) Field of Classification Search ............ 137/494, 137/514, 514.5, 529, 540; 251/337
See application file for complete search history.

(56) References Cited

U.S. PATENT DOCUMENTS 973,211 A * 10/1910 Reynolds ............ 137/514.5
3,487,852 A * 1/1970 Kikendall ............ 137/514.5
4,194,527 A * 3/1980 Schonwald et al. ......... 137/543
4,463,929 A * 8/1984 Dantlgraber et al. ......... 251/44
5,396,924 A * 3/1995 Voss .................. 137/491

FOREIGN PATENT DOCUMENTS

DE    100 63 153 A1 *  6/2002
WO    WO 2004/033943 A1 *  4/2004

* cited by examiner

Primary Examiner—Ramesh Krishnamurthy

(57) ABSTRACT

In the housing 1 of a hydraulic machine, the pressure Pi acts in the chamber 2. For this purpose, a passage opening 4 is provided, which is formed as a valve seat 5. A valve body 6 can be displaced longitudinally in the housing 1 and forms a pressure-tight spring chamber for an inner valve spring 21. The spring chamber is connected to the chamber 2 via a pressure equalizing hole 9. The prestress of the inner valve spring 21 can be set by means of a setting screw 18. In addition, there is an outer valve spring 22. Both the valve springs load the valve body 6 with the effect of closing it. The pressure equalizing valve described combines a compact design with an advantageous flow characteristic. When a maximum value of $p_1$ is reached, the valve body 6 lifts off the valve seat 5 and hydraulic fluid from the chamber 2 flows away via the valve chamber 3.

15 Claims, 2 Drawing Sheets

PRESSURE LIMITING VALVE IN A HYDRAULIC MACHINE HAVING A PRESSURE LIMITING VALVE

BACKGROUND AND SUMMARY OF THE INVENTION

The invention relates to a pressure limiting valve in a hydraulic machine. Pressure limiting valves of this type are known; they monitor and limit the maximum permissible pressure of the hydraulic fluid in a hydraulic machine. Pressure limiting valves of this type are predominantly used for limiting the filling pressure of hydraulic machines. However, the scavenging pressure of hydraulic machines is often monitored and limited by pressure limiting valves of this type. As soon as the pressure to be limited exceeds a specific maximum value, the pressure limiting valve opens and permits hydraulic fluid to flow out of the region under excess pressure into a region of the hydraulic machine in which a considerably lower pressure prevails.

In the basic form, pressure limiting valves of this type comprise a valve body having a spring under prestress. The spring presses the valve body onto a valve seat. In this case, there is equilibrium between the spring force and the forces from the pressures on either side of the valve seat. The pressure prevailing in the spring chamber assists the spring force. The pressure in the chamber on the other side of the valve, that is to say upstream of the valve disc, acts against the spring force and the pressure in the spring chamber.

Conflicting requirements are placed on pressure limiting valves of this type in hydraulic machines. For example, the valve seat should be as large as possible in order that the flow resistance of the opened pressure limiting valve is low. However, a large valve disc leads to high actuating forces, which have to be applied by a correspondingly large and powerful spring. Pressure limiting valves of such simple construction thus become very large.

Another problem in pressure limiting valves is that, in the case of pressure limiting valves with a conical valve disc, when the valve is opened, flow forces occur which act on the valve body with the effect of closing it. It has therefore already been proposed to avoid conical valve discs and, instead, to provide the valve bodies with flow guiding elements in the region of the valve seat, which are intended to have a beneficial effect on the flow.

Finally, in the case of pressure limiting valves, the spring force should be adjustable. In the case of a large and powerful valve spring, the result in this case is additional problems, which increase the outlay on construction and the space required by such valves.

The invention is based on the object of designing a pressure limiting valve in a hydraulic machine in such a way that, with a simple construction and reliable operation, it requires only little installation space and nevertheless has a very good flow characteristic.

This object is achieved with all of the features of Claim 1. It therefore comprises a pressure limiting valve in a hydraulic machine, having a valve seat which is fixed to the housing and forms the passage opening, having a valve body which comprises a valve disc matched to the valve seat and a tubular valve stem with an inner valve spring located therein and is guided in a bore in the housing of the hydraulic machine such that it can be displaced longitudinally and is sealed off, so that the bore in the housing, together with the valve body guided therein, forms a pressure-tight spring chamber for the inner valve spring, having an outer valve spring surrounding the valve stem on the outside, the two valve springs loading the valve body in the direction of the valve seat, having a valve chamber which extends transversely with respect to the longitudinal axis of the valve body and which, when the valve body is lifted off the valve seat, is connected via the flow opening to the chamber upstream of the valve seat, and having a hydraulic connection used for pressure equalization between the chamber upstream of the valve seat and the pressure-tight spring chamber.

In this case, all the features of the pressure limiting valve according to the invention act together in a mutually supplementary manner. Because the spring force is distributed to two valve springs, the valve springs are therefore connected in parallel, the installation space required for the pressure limiting valve in the hydraulic machine is reduced. The result here is the possibility that the outer valve spring surrounding the valve stem on the outside is dimensioned in accordance with the minimum pressure Setting of the pressure limiting valve, and therefore does not need to be adjustable. Only the inner valve spring, arranged in the tubular valve stem, then has to be provided with such a device for changing the prestress. This device can likewise be particularly compact, since it needs to be dimensioned only for the inner spring. A further reduction in the installation space results from the hydraulic connection, used for pressure equalization, between the chamber upstream of the valve seat and the pressure-tight spring chamber for the inner valve springs. A hydraulic connection of this type permits the pressure prevailing in the chamber upstream of the valve seat to become effective only on part of the end face of the valve body, while pressure equalization on the valve body is otherwise largely achieved. The actuating force for overcoming the closing force exerted by the inner valve spring is reduced considerably as a result. At the same time, the desired large flow cross section, which results from the diameter of the valve disc and the valve seat, is nevertheless available.

If, according to an advantageous development, the valve springs are formed as helical springs which are guided on the valve stem, the small amount of space required and the reliable operation of the pressure limiting valve according to the invention are promoted further as a result.

A particularly simple refinement is also achieved in that the valve disc forms a continuous base for the valve stem, which base acts as an active surface for the inner valve spring and has a pressure equalizing hole which forms the hydraulic connection between the chamber upstream of the valve seat and the pressure-tight spring chamber. Thus, the desired pressure equalization can readily be achieved by a simple hole.

The outer valve spring surrounding the valve stem on the outside can advantageously act on an annular collar, serving as an active surface, which is formed on the outside of the valve stem.

It is readily possible to guide the valve body of the pressure limiting valve according to the invention in the housing of the hydraulic machine itself. However, mounting is made considerably easier if, according to a further advantageous refinement, the pressure limiting valve according to the invention is provided with a tubular insert housing fixed in the housing of the hydraulic machine in a pressure-tight manner, in which the valve stem is guided in a pressure-tight manner and which, with an annular end facing the interior of the housing, acts as a supporting surface for the outer valve spring, the distance between the annular end of the insert housing and the annular collar formed on the outside of the valve stem determining the prestress of the outer valve spring.

In this case, the possibility results that the outer valve spring is dimensioned in accordance with the minimum pressure setting of the pressure limiting valve, that is to say does not have to be provided with its own device for setting the spring prestress.

According to another advantageous refinement, the inner valve spring can be supported on a continuous base of the insert housing, the distance between the continuous base of the insert housing and the continuous base of the valve stem determining the prestress of the inner valve spring. In this case, it is readily possible to provide a threaded hole in the continuous base of the insert housing, into which a setting screw can be screwed; the latter can be fixed by a locknut arranged on the outside and, as it is rotated, the prestress of the inner valve spring is changed. The result is, therefore, a simple possible adjustment, which likewise does not require any noticeable amount of space.

It is advantageous in this case if the end of the setting screw that faces the valve body projects into an intermediate sleeve with a hat-shaped cross section, which is used as an internal guide and supporting element for the inner valve spring. This intermediate sleeve makes it easier to rotate the setting screw.

The flow conditions as the pressure limiting valve according to the invention is opened are improved further by the fact that a flow guide element is formed on the valve disc, faces the chamber upstream of the valve seat and has transverse openings. The flow guide element can have a substantially cylindrical shape, the transverse openings being formed as holes or grooves.

By dimensioning the valve stem in relation to the valve seat, the characteristics of the pressure limiting valve according to the invention can be varied. It is preferable in the pressure limiting valve according to the invention if the external diameter d of the valve stem is smaller than the diameter D of the valve disc on the valve seat. The pressure limiting valve dimensioned in this way is suitable for installation conditions in which the pressure $p_1$ of the hydraulic fluid in the chamber 2 upstream of the valve disc 7 is higher than the pressure $p_2$ in the valve chamber. The valves installed in this way thus monitor the pressure $p_1$ in the chamber upstream of the valve disc and open as soon as this pressure exceeds a specific maximum value.

Conversely, however, it is also possible to dimension the pressure limiting valve according to the invention in such a way that the external diameter of the valve stem is larger than the diameter of the valve disc on the valve seat. In this case, the pressure limiting valve according to the invention is installed in such a way that the pressure $p_2$ in the valve chamber is the operationally higher pressure and is monitored with respect to reaching a maximum value.

Accordingly, the invention also relates to a hydraulic machine having a pressure limiting valve according to Claim 12, in which the external diameter d of the valve stem is smaller than the diameter D of the valve disc on the valve seat, the pressure limiting valve being installed in such a way that it monitors the pressure Pi in the chamber upstream of the valve seat with respect to reaching a maximum value.

However, the invention also relates to a hydraulic machine having a pressure limiting valve according to Claim 13, in which the external diameter of the valve stem is larger than the diameter of the valve disc on the valve seat, the pressure limiting valve being installed in such a way that it monitors the pressure $p_2$ in the valve chamber with respect to reaching a maximum value.

BRIEF DESCRIPTION OF THE FIGURES

The invention will be explained in more detail below in an exemplary embodiment illustrated by drawing. In the figures.

Figure 1:
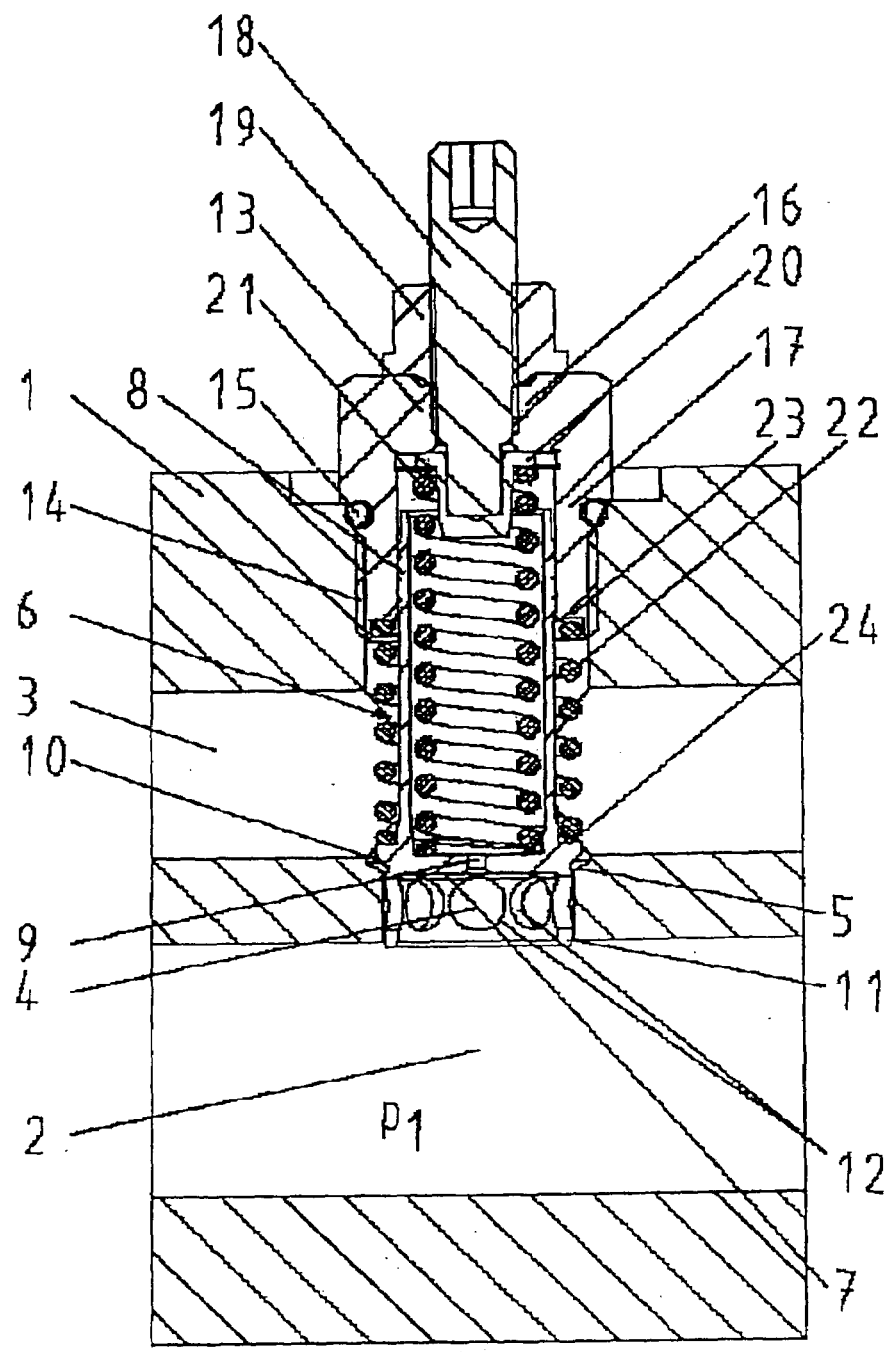
FIG. 1 is a partial longitudinal section through a hydraulic machine having the pressure limiting valve according to the invention.
Figure 2:
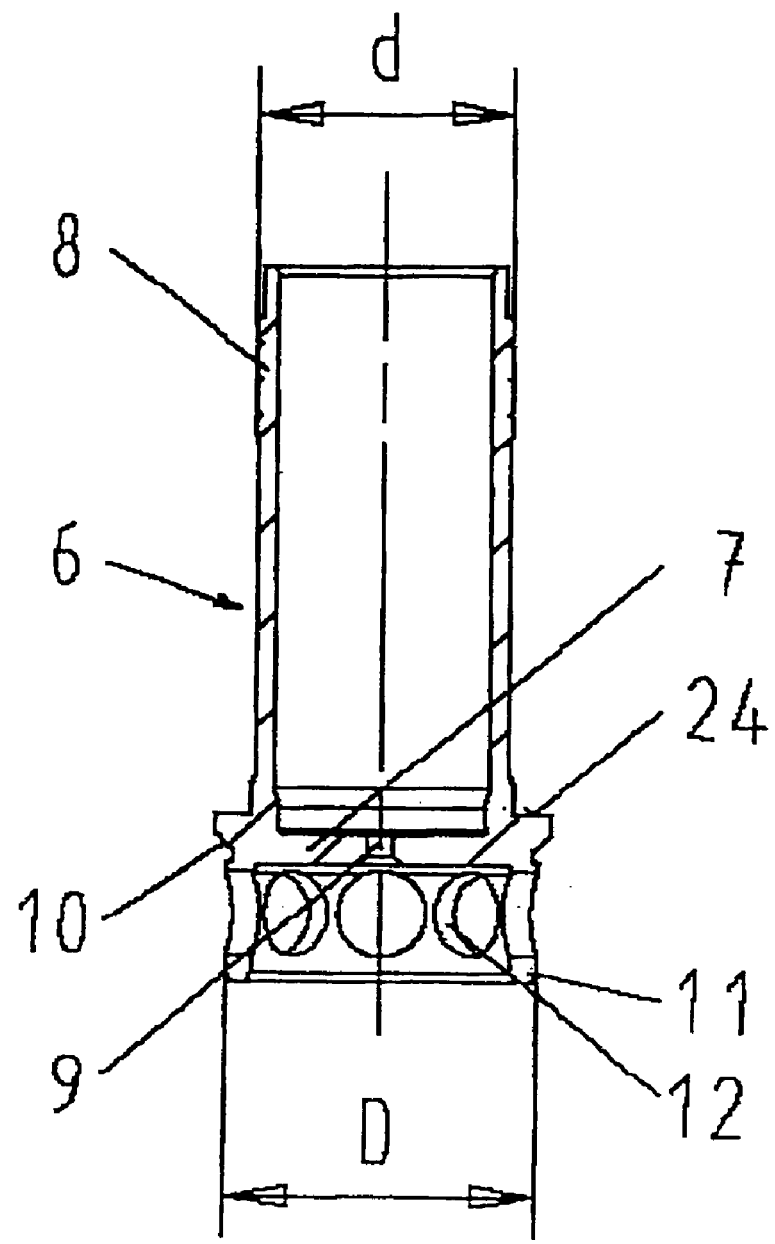

The subject of FIG. 2 is the enlarged illustration of a detail from FIG. 1.

DETAILED DESCRIPTION OF THE PREFERRED EMBODIMENT

FIG. 1 illustrates a partial longitudinal section through the housing 1 of a hydraulic machine. Formed in the housing 1 are a chamber 2 and a valve chamber 3 which, during the operation of the machine, contain hydraulic fluid and can be connected to each other via a passage opening 4. Here, the pressure of the hydraulic fluid in the chamber 2 is designated $p_1$ and that in the valve chamber 3 is designated $p_2$. In the exemplary embodiment illustrated, the pressure limiting valve is intended to achieve the situation in which the pressure $p_1$, for example the filling pressure or scavenging pressure, does not exceed a specific maximum value. When the maximum value of $p_1$ is reached, the pressure limiting valve opens and hydraulic fluid flows away via the passage opening 4 into the valve chamber 3. The latter can be, for example, the first section of a transverse duct which leads the hydraulic fluid flowing out of the chamber 2 into the hydraulic circuit of the hydraulic machine, for example into a storage tank. In this way, the lower, desired operating pressure is set again in the chamber 2.

The passage opening 4 between the chamber 2 and the valve chamber 3 is formed as a valve seat 5 of the pressure limiting valve. For this purpose, the valve seat 5 is formed as a section of the outer of a cone, which widens upwards in FIG. 1. Operatively connected to the valve seat 5 is the valve disc 7 of a valve body which, overall, is designated by the reference number 6.

Also part of the valve body 6 is a valve stem 8, which adjoins the valve disc 7 and is formed as a tube with an annular cross section. In this case, the valve disc 7 forms a continuous base for the tubular valve stem 8. In the continuous base there is a pressure equalizing hole 9, which produces a hydraulic connection between the chamber 2 upstream of the valve disc 7 and the interior of the valve stem 8. The valve disc 7 has a conical face 10 which is matched to the conical outer of the valve seat 5.

On the end face of the valve disc 7 which faces the chamber 2 there is a flow guide element 11, which has a substantially cylindrical shape and is provided with transverse openings 12 in the form of holes or grooves. The flow guide element 11 is formed in one piece with the valve body 6.

Screwed into the housing 1 of the hydraulic machine, by means of a thread 14, is a tubular insert housing 13. 15 designates an annular seal, which effects a pressure-tight connection between the housing 1 and the insert housing 13. In the region of the outer side of the housing 1, the insert housing 13 has an end wall, which forms a continuous base 16 which is followed towards the inner of the housing 1 by a tubular section 17, in which the valve stem 8 is guided such that it can be displaced longitudinally. The fit between the external diameter of the valve stem 8 and the internal diameter of the tubular section 17 is in this case chosen such that, in spite of the ability to be displaced mutually, the valve stem 8, together with the insert housing 13, forms a pressure-tight internal space, which has a hydraulic connection to further regions of the housing 1 only via the hole 9.

A setting screw 18 is inserted into a central threaded hole in the continuous base 16. It is formed as a hexagonal socket screw. Its respective position is secured by a locknut 19.

Placed on the inner end of the setting screw 18, facing the valve stem 8, is an intermediate sleeve 20. It forms a supporting element for an inner valve spring 21, which is designed as a helical spring. The inner valve spring 21 acts with its opposite end on the continuous base of the valve stem 8. This continuous base, which is formed by the valve disc 7, thus serves as an active surface for the inner valve spring 21. By means of the setting screw 18, the prestress of the inner valve spring 21 can be adjusted. The inner valve spring 21 is guided on the inner face of the valve stem 8 and is located in the pressure-tight spring chamber which is formed by the valve body 6 and the insert housing 13.

Guided on the outside of the valve stem 8 is the outer valve spring 22, likewise designed as a helical spring. Its supporting face is the annular end face 23, which is formed on the tubular section 17 of the insert housing 13 and faces the valve seat 5. With its opposite end, the outer valve spring 22 acts on an annular collar 24, which is formed on the valve stem 8, on the outside in the region of the valve disc 7. The annular collar 24 forms an active surface for the outer valve spring 22. Here, the distance between the inner, annular end face of the insert housing and the annular collar 24 determines the prestress of the outer valve spring 22.

Both the valve springs 21, 22 load the valve body 6 with the effect of pressing it onto the valve seat 5. However, it should be recorded that the inner valve spring 21 is located in a sealed spring chamber, which is sealed off with respect to the valve chamber 3 and has a hydraulic connection to the chamber 3 upstream of the valve seat 5 only via the pressure equalizing hole 9 located in the valve disc 7. Thus, the same pressure $p_1$ as in the chamber 2 upstream of the valve disc 7 always prevails in the spring chamber for the inner valve spring 21. By contrast, the outer valve spring 22 is located in a largely open manner in the valve chamber 3, in which the pressure $p_2$ prevails. The pressure $p_2$ thus also acts on the annular end face 23 of the insert housing 13 and also on the annular collar 24.

FIG. 2 shows details of the valve body 6 already explained in an even clearer illustration.

The function of the pressure limiting valve according to the invention will now be described.

In the exemplary embodiment illustrated in FIG. 1, a pressure pi, which is higher than the pressure P2 in the valve chamber 3, prevails in the chamber 2 upstream of the valve seat 5. Nevertheless, the pressure limiting valve remains closed as long as a specific maximum value of $p_1$ is not exceeded. This is because the following forces act in the longitudinal direction of the valve body 6:

The two valve springs 21, 22 and also the pressure $p_2$ of the hydraulic fluid in the valve chamber act with a closing effect, if the latter acts on the annular face of the annular collar 24. All of these forces press the valve disc 7 onto the valve seat 5. Oriented in the opposite direction are the hydraulic forces which act on the valve disc 7 and which are caused by the pressure $p_1$ of the hydraulic fluid in the chamber 2 upstream of the valve disc. However, the force caused by this acts only to the extent to which the annular face within the largest diameter D exposed in the chamber 2, minus the external diameter d of the valve stem 8, is acted on. The area within the diameter d remains ineffective, since here the forces acting on the valve disc from both sides cancel each other, because of the pressure equalizing hole 9. Nevertheless, the remaining compressive force exerted on the annular area which remains effective is sufficient to overcome the oppositely acting forces arising from the two valve springs 21, 22 and the pressure $p_2$ and to lift the valve body 6 when the maximum value of $p_1$ is reached.

When the pressure limiting valve is opened, the flow guide element 11 with its transverse openings 12 has an advantageous effect. This is because the flow forces acting to close the valve, which inevitably occur in the case of a conical valve disc, are reduced or even avoided. In this case, the holes in the flow guide element 11 can be arranged at a specific angle or the grooves can run out at corresponding angles.

The extensive pressure equalization which arises on the valve disc 7 because of the pressure equalizing hole 9 has the advantage that, although it is possible to operate with a passage opening of large cross section which is beneficial to the flow process, the requisite spring force is reduced in this case.

Finally, the parallel arrangement of the two valve springs 21, 22 is added in a supportive manner, which results in a compact design and nevertheless a good flow characteristic. In this case, the outer valve spring 22 is dimensioned in accordance with the minimum pressure setting of the valve. The inner valve spring 21 covers the setting range of the valve which lies above the minimum setting.

The force equilibrium underlying the function of the pressure limiting valve illustrated in FIG. 1 is based on the fact that the external diameter d of the valve stem 8 is smaller than the diameter D of the valve disc 7 on the valve seat 5. However, designs are also possible in which the relationships are inverted, that is to say the external diameter of the valve stem 8 is larger than the diameter of the valve disc on the valve seat 5. In this case, the pressure limiting valve according to the invention is suitable for applications in which a pressure $p_2$ which is greater than the pressure $p_1$ in the chamber upstream of the valve disc 7 prevails in the valve chamber 3.

What is claimed is:

1. Pressure limiting valve in a hydraulic machine, having a valve seat (5) which is fixed to the housing and forms the passage opening (4), having a valve body (6) which comprises a valve disc (7) matched to the valve seat (5) and a tubular valve stem (8) with an inner valve spring (21) located therein and is guided in a bore in the housing of the hydraulic machine such that it can be displaced longitudinally and is sealed off, so that the bore in the housing, together with the valve body (6) guided therein, forms a pressure-tight spring chamber for the inner valve spring (21), having an outer valve spring (22) surrounding the valve stem (8) on the outside, the two valve springs (21, 22) loading the valve body in the direction of the valve seat (5), having a valve chamber (3) which extends transversely with respect to the longitudinal axis of the valve body (6) and which, when the valve body (6) is lifted off the valve seat (5), is connected via the flow opening (4) to the chamber (29) upstream of the valve seat (5), and having a hydraulic connection used for pressure equalization between the chamber (2) upstream of the valve seat (5) and the pressure-tight spring chamber.

2. Pressure limiting valve according to claim 1, in which the valve springs (21, 22) are formed as helical springs which are guided on the valve stem (8).

3. Pressure limiting valve according to claim 2, in which the valve disc (7) forms a continuous base for the valve stem (8), which base acts as an active surface for the inner valve spring (21) and has a pressure equalizing hole (9) which forms the hydraulic connection between the chamber (2) upstream of the valve seat (5) and the pressure-tight spring chamber.

4. Pressure limiting valve according to claim 2, having an annular collar (24) which is formed on the outside of the valve stem (8) and serves as an active surface for the outer valve spring (22).

5. Pressure limiting valve according to one of claim 2, having a tubular insert housing (13) fixed in the housing (1) of the hydraulic machine in a pressure-tight manner, in which the valve stem (8) is guided in a pressure-tight manner and which, with an annular end (23) facing the interior of the housing (1), acts as a supporting surface for the outer valve spring (22), the distance between the annular end (23) of the insert housing (13) and the annular collar (24) formed on the outside of the valve stem (8) determining the prestress of the outer valve spring (22).

6. Pressure limiting valve according to claim 5, in which the inner valve spring (21) is supported on a continuous base (16) of the insert housing (13), the distance between the continuous base (16) of the insert housing (13) and the continuous base of the valve stem (8) determining the prestress of the inner valve spring (21).

7. Pressure limiting valve according to claim 6, having a threaded hole in the continuous base (16) of the insert housing (13), into which a setting screw (18) can be screwed, which can be fixed by a locknut (19) arranged on the outside and whose rotation changes the prestress of the inner valve spring (21).

8. Pressure limiting valve according to claim 7, in which the end of the setting screw (18) that faces the valve body (6) projects into an intermediate sleeve with a hat-shaped cross section, which is used as an internal guide and supporting element for the inner valve spring (21).

9. Pressure limiting valve according to claim 1, in which a flow guide element (11) is formed on the valve disc (7), faces the chamber (2) upstream of the valve seat (5) and has transverse openings (12).

10. Pressure limiting valve according to claim 9, in which the flow guide element (11) has a substantially cylindrical shape.

11. Pressure limiting valve according to claim 9, having a flow guide element (11) whose transverse openings (12) are formed as holes or grooves.

12. Pressure limiting valve according to claim 1, in which the external diameter d of the valve stem (8) is smaller than the diameter D of the valve disc (7) on the valve seat (5).

13. Pressure limiting valve according to one of claim 1, in which the external diameter of the valve stem is larger than the diameter of the valve disc on the valve seat.

14. Hydraulic machine having a pressure limiting valve according to claim 12, the pressure limiting valve being installed in such a way that it monitors the pressure $p_1$ in the chamber (2) upstream of the valve seat (5) with respect to reaching a maximum value.

15. Hydraulic machine having a pressure limiting valve according to claim 13, the pressure limiting valve being installed in such a way that it monitors the pressure $p_2$ in the valve chamber (3) with respect to reaching a maximum value.

* * * * *